(12) United States Patent
Zheng et al.

(10) Patent No.: US 10,775,155 B2
(45) Date of Patent: Sep. 15, 2020

(54) HEIGHT MEASUREMENT APPARATUS (71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Yunjiao Zheng, Beijing (CN); Jian Li, Beijing (CN); Zhibin Li, Beijing (CN); Yingnan Wang, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 54 days.

(21) Appl. No.: 15/983,291

(22) Filed: May 18, 2018

(65) Prior Publication Data
US 2019/0003824 A1 Jan. 3, 2019

(30) Foreign Application Priority Data
Jun. 28, 2017 (CN) .......................... 2017 1 0509105

(51) Int. Cl.
G01B 5/28 (2006.01)
G01B 11/06 (2006.01)
(Continued)

(52) U.S. Cl.
CPC .......... *G01B 11/0608* (2013.01); *G01B 3/008* (2013.01); *G01B 5/061* (2013.01); *G01B 11/007* (2013.01); *G01B 5/28* (2013.01)

(58) Field of Classification Search
CPC . G01B 3/00; G01B 7/012; G01B 7/28; G01B 7/34; G01B 21/00; G01B 21/20;
(Continued)

(56) References Cited

U.S. PATENT DOCUMENTS

| 6,295,866 | B1 | 10/2001 | Yamamoto et al. |
| 2009/0320304 | A1* | 12/2009 | Lin ........................ G01B 5/061 |
| | | | 33/354 |
| 2010/0269330 | A1* | 10/2010 | Higuchi .................. H01L 24/75 |
| | | | 29/729 |

FOREIGN PATENT DOCUMENTS

| CN | 2742035 Y | 11/2005 |
| CN | 101029817 A | 9/2007 |

(Continued)

OTHER PUBLICATIONS

First Office Action for Chinese Patent Application No. 201710509105.3 dated Feb. 3, 2019.

*Primary Examiner* — Brandi N Hopkins
(74) *Attorney, Agent, or Firm* — Calfee, Halter & Griswold LLP (57) ABSTRACT A height measuring apparatus. The height measuring apparatus includes a frame; a driving mechanism including a driving body that is connected with and movable along the frame and a moving part that is vertically movable with respect to the driving body. The driving body includes an altitude detector configured to detect an altitude of the moving part; a force transfer rod connected with the moving part to form a lever structure; a touching head connected with a first end of the force transfer rod; a dynamometer connected with a second end of the force transfer rod; a controller configured to stop the moving part from moving in response to the value of the force detected by the dynamometer reaching a predetermined force value; and a location detector configured to detect a location of a foreign object and send the detected location of the foreign object to the controller.

17 Claims, 3 Drawing Sheets (51) Int. Cl.
*G01B 11/00* (2006.01)
*G01B 3/00* (2006.01)
*G01B 5/06* (2006.01)

(58) Field of Classification Search
CPC ...... G01B 21/30; G01B 5/20; G01B 11/0608; G01B 11/007; G01B 5/061; G01B 5/28; G01B 3/008; E02D 29/14; G01C 7/02
See application file for complete search history.

(56) References Cited

FOREIGN PATENT DOCUMENTS

| | | |
|---|---|---|
| CN | 101216281 A | 7/2008 |
| CN | 201110750 Y | 9/2008 |
| CN | 201532192 U | 7/2010 |
| CN | 205506034 U | 8/2016 |

* cited by examiner

HEIGHT MEASUREMENT APPARATUS

RELATED APPLICATIONS

The present application claims priority to Chinese Patent Application No. 201710509105.3 filed on Jun. 28, 2017, the entire contents of which are hereby incorporated by reference.

TECHNICAL FIELD

The present disclosure relates to a height measuring apparatus.

BACKGROUND

In the related art, the operation of detecting foreign object height is complicated and the measurement result thereof has a relatively large deviation. In addition, existing height measuring apparatuses have complicated structures and high costs. Prior art apparatus sometimes also problematically scratch a film during the measurement process.

SUMMARY

The present disclosure discloses a height measuring apparatus. The height measuring apparatus comprises a frame; a driving mechanism comprising a driving body that is connected with and movable along the frame and a moving part that is vertically movable with respect to the driving body, wherein the driving body comprises an altitude detector configured to detect an altitude of the moving part; a force transfer rod connected with the moving part to form a lever structure; a touching head connected with a first end of the force transfer rod; a dynamometer connected with a second end of the force transfer rod; a controller configured to stop the moving part from moving in response to the value of the force detected by the dynamometer reaching a predetermined force value; and a location detector configured to detect a location of a foreign object and send the detected location of the foreign object to the controller.

In some embodiments, the force transfer rod comprises a first rod body and a second rod body. The length of the first rod body is greater than the length of the second rod body.

In some embodiments, the length of the first rod body is a positive integral multiple of the length of the second rod body.

In some embodiments, the touching head is connected with an end of the first rod body away from the second rod body. The dynamometer is connected with an end of the second rod body away from the first rod body.

In some embodiments, the first rod body and the second rod body extend in the same direction.

In some embodiments, the altitude detector comprises a ruler.

In some embodiments, the ruler comprises an optical ruler.

In some embodiments, the height measuring apparatus further comprises a stabilizer. The stabilizer locates at the moving part and connects with the force transfer rod, and is configured to anti-shake the force transfer rod.

In some embodiments, the stabilizer comprises at least one elastic part connected between the force transfer rod and the moving part.

In some embodiments, the moving part further comprises a fixing rod. The at least one elastic part is connected with the fixing rod.

In some embodiments, the at least one elastic part comprises a first elastic part and a second elastic part. The first elastic part is connected between the moving part and the first rod body. The second elastic part is connected between the moving part and the second rod body.

In some embodiments, the fixing rod extends obliquely with respect to the vertical direction. The first elastic part is connected with a first end of the fixing rod. The second elastic part is connected with a second end of the fixing rod.

In some embodiments, the touching head comprises a horizontal plate.

In some embodiments, the moving part comprises a mover and a transmission part. The transmission part is connected between the mover and the force transfer rod. The driving body comprises a base body and a stator. The base body is movably connected with the frame. The stator is located at the base body and configured to actuate the mover.

In some embodiments, the moving part further comprises a fixing mount. The fixing mount is connected with the transmission part. The dynamometer is located at an end of the fixing mount away from the transmission part.

In some embodiments, the frame comprises two pillars arranged at intervals and located at both sides of an air float board; and a mounting rack, both ends of which are respectively connected with the two pillars. A guiding part is arranged on the mounting rack along the extending direction of the mounting rack. The driving body is movable along the guiding part.

In some embodiments, the controller is further configured to calculate an altitude variation of the moving part based on the altitude of the moving part detected by the altitude detector.

In some embodiments, the controller is further configured to alert in response to the altitude variation being greater than a predetermined height value.

BRIEF DESCRIPTION OF THE DRAWINGS

These and other aspects of the present disclosure will be apparent from the embodiments described hereinafter and will be further explained by way of example with reference to the accompanying drawings in which.

DETAILED DESCRIPTION

The embodiments of the present disclosure are described in detail below, examples of which are illustrated in the accompanying drawings. The embodiments described below with reference to the accompanying drawings are exemplary and intend to explain the present disclosure, but should not be construed as limiting the present disclosure. The person having ordinary skill in the art may make various changes, modifications, substitutions and variations to these embodiments without departing from the principle and spirit of the present disclosure. The scope of the disclosure is defined by the claims and their equivalents.

In the description of the present disclosure, it should be understood that the directional and positional relationship indicated by the terms "length", "upper", "lower", "front", "back", "vertical", "horizontal", "inside", "outside", etc. is the directional and positional relationship shown based on the drawings. These terms are only used to facilitate the description of the present disclosure and simplify the description, rather than indicate or imply that the indicated apparatus or element must have a particular orientation or be constructed and operated in a specific orientation. Therefore, these terms should not be construed as limiting the present disclosure.

In the description of the present disclosure, it should be noted that the terms "mount", "arrange", "interconnect", "connect" and the like should be interpreted broadly unless explicitly stated or defined otherwise. For example, the connection relationships to which these terms relate may be fixed connections, detachable connections, or integral connection; may be mechanical connections or electrical connections; may be direct connections or indirect connections through an intermediary; may be connections inside a plurality of elements. For a person having ordinary skill in the art, the specific meanings of the above terms in the present disclosure can be understood according to specific situations.

Figure 1:
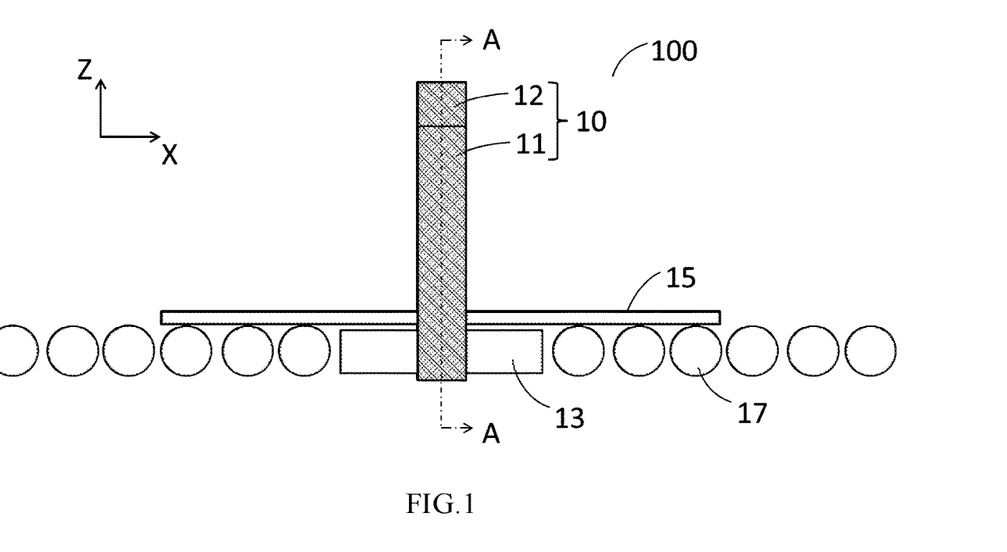
FIG. 1 schematically shows a side view of a height measuring apparatus according to an embodiment of the present disclosure.
Figure 2:
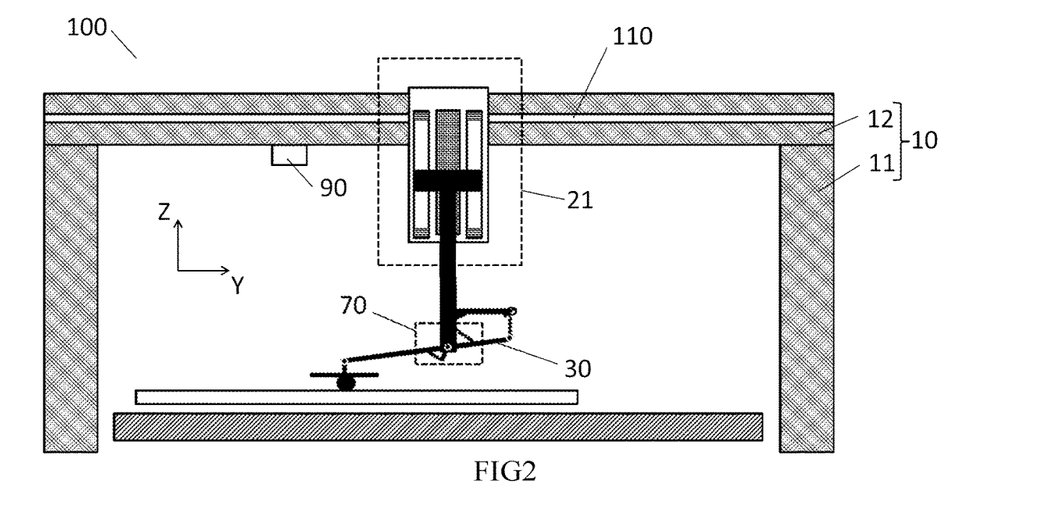
FIG. 2 schematically shows a view of the height measuring apparatus of FIG. 1 along the line A-A.
Figure 3:
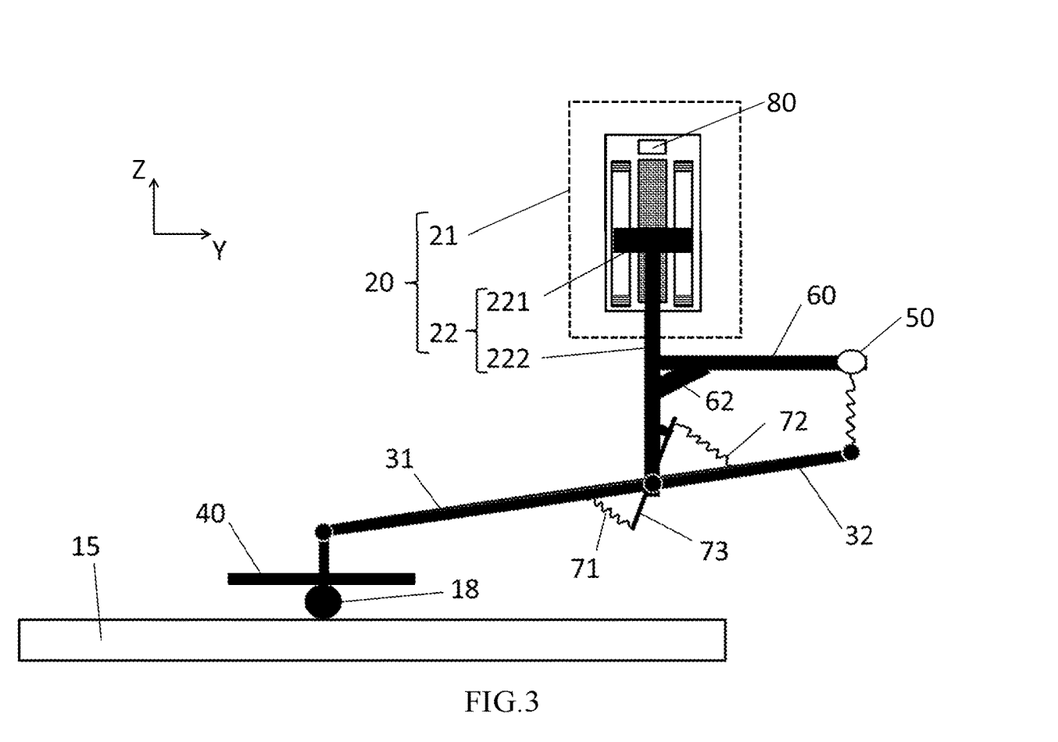
FIG. 3 schematically shows a partial view of the height measuring apparatus of FIG. 1 along the line A-A.

The height measuring apparatus 100 according to an embodiment of the present disclosure will be described below with reference to the accompanying drawings. FIG. 1 schematically shows a side view of a height measuring apparatus 100 according to an embodiment of the present disclosure. FIG. 2 schematically shows a view of the height measuring apparatus 100 of FIG. 1 alone the line A-A. FIG. 3 schematically shows a partial view of the height measuring apparatus 100 of FIG. 1 alone the line A-A.

The height measuring apparatus 100 may comprise a frame 10, a driving mechanism 20, a force transfer rod 30, a touching head 40, a dynamometer 50, a location detector 90, and a controller. The driving mechanism 20 may comprise a driving body 21 and a moving part 22. The moving part 22 comprises a mover 221 and a transmission part 222. The driving body 21 is connected with and movable along the frame 10. In some embodiments, the mounting rack 12 of the frame 10 is arranged horizontally, so the driving body 21 is movable along the horizontal direction. The moving part 22 is connected with and vertically movable with respect to the driving body 21. The location detector 90 is configured to detect the location of a foreign object 18. An altitude detector 80 may be provided on the driving body 21. In some embodiments, the altitude detector 80 comprises a ruler 213. The ruler 213 may be used to identify the position of the moving part 22.

The force transfer rod 30 may comprise a first rod body 31 and a second rod body 32. In some embodiments, the length of the first rod body 31 is greater than the length of the second rod body 32, i.e., the first rod body 31 is a longer rod and the second rod body 32 is a shorter rod. In some embodiments, the length of the first rod body 31 is an integer multiple of the length of the second rod body 32. The first rod body 31 is connected with the second rod body 32. The force transfer rod 30 is connected with the moving part 22 (specifically, a transmission part 222). In some embodiments, the connection between the first rod body 31 and the second rod body 32 is connected with the moving part 22 to form a lever structure, with the connection being the fulcrum of the lever structure. The moving part 22 may drive the force transfer rod 30 to move vertically when the moving part 22 is moving vertically (i.e., along the Z direction shown in the drawings). That is, the first rod body 31 and the second rod body 32 may move vertically as the moving part 22 moves.

In some embodiments, the touching head 40 is located at an end of the force transfer rod 30 and the dynamometer 50 is configured to detect the force of the other end of the force transfer rod 30. In some embodiments, the touching head 40 may be located at an end of the first rod body 31 away from the second rod body 32, and the dynamometer 50 detects the force at an end of the second rod body 32 away from the first rod body 31. The touching head 40 may be used to contact with the object to be detected, for example, the foreign object 18 on the glass plate 15.

The force transfer rod 30 can transfer the force between the touching head 40 and the foreign object 18 to the dynamometer 50 in an (multiply) amplified manner. When the touching head 40 detects (i.e., touches) the foreign object 18, there is a force (e.g., pressure) between the touching head 40 and the foreign object 18. This force can be amplified at the dynamometer 50 by the leverage amplification of the force transfer rod 30, so that the dynamometer 50 can measure the force more accurately.

The location detector 90 can be used to detect the location of foreign object 18. Although in the drawings, the location detector 90 is shown as disposed on the frame 10, this is merely illustrative and not restrictive. The location detector 90 is electrically connected with the controller and can send the detected information to the controller. A predetermined force value can be set in advance and stored in a non-transitory computer-readable storage medium. The controller is configured to stop the moving part 22 from moving when the value of the force detected by the dynamometer 50 reaches the predetermined force value. During the detection, the force of the force transfer rod 30 on the foreign object 18 changes with the movement of the force transfer rod 30. Specifically, the dynamometer 50 can signal the controller when the value of the force detected by the dynamometer 50 reaches the predetermined force value. After receiving the signal, the controller may control the driving mechanism 20 to stop running so that the moving part 22 is stopped from moving. The predetermined force value may be set according to the specific situation which is not limited specifically in this disclosure.

In some embodiments, aspects of the controller may be integrated into one or more common devices through which the functions of the controller described herein may be enacted, at least in part. Such common devices may include processors, programmable logic controllers (PLCs), field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The predetermined force value may be set in a non-transitory computer-readable storage medium. "Non-transitory computer-readable storage medium" refers to medium and/or devices that enable persistent storage of information and/or storage that is tangible, in contrast to mere signal transmission, carrier waves, or signals per se. Thus, computer-readable storage medium refers to non-signal bearing media. The computer-readable storage medium includes hardware such as volatile and non-volatile, removable and non-removable media and/or storage devices implemented in a method or technology suitable for storage of information such as computer readable instructions, data structures, program modules, logic elements/circuits, or other data. Examples of the computer-readable storage medium may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

Before the detection, the touching head 40 (especially its surface in contact with the foreign object 18) is at a reference position which has the same altitude as the upper surface of the glass plate 15. When a foreign object 18 is present on the glass plate 15, the location detector 90 can detect the location of the foreign object 18. Then, the touching head 40 can be moved to a location corresponding to the foreign object 18 by means of the driving mechanism 20. When the touching head 40 is in contact with the foreign object 18, the end of the first rod body 31 away from the second rod body 32 is relatively stationary with respect to the foreign object 18. Since the moving part 22 will continue to move downward, the fulcrum and the end of the second rod body 32 away from the first rod body 31 also move downward. In this way, the value of the force detected by the dynamometer 50 gradually increases. When the value of the force detected by the dynamometer 50 reaches the predetermined force value, the controller controls the moving part 22 to stop moving (downward). At this point, the altitude of the moving part 22 may be determined by means of the ruler 213. The height of the foreign object 18 can be obtained by subtracting the altitude of the moving part 22 at the reference position from the current altitude of the moving part 22.

The height measuring apparatus 100 according to an embodiment of the present disclosure may detect the height of the foreign object 18 on the glass plate 15. By means of the principle of leverage amplification of force, an accurate measurement of the force can be achieved, so that the moving part 22 can be actuated more precisely and quickly, so that the altitudes of the moving part 22 accurately reflects the height of the foreign object 18, thereby realizing the accurate measurement of the height of the foreign object 18. The height measuring apparatus 100 has a simpler structure and lower cost.

In practice, the chipping apparatus uses the height measuring apparatus 100 according to an embodiment of the present disclosure to determine the height of a defect, thereby increasing the detection accuracy and speed, and preventing the glass plate 15 from being recognized as no good as a result of chip misdetection and avoiding the foreign objects being brought into the chipping apparatus for a second opportunity by opening its door.

In some embodiments, the ruler 213 may be an optical ruler. The optical ruler has good detection accuracy and can improve the accuracy of the height measurement.

In some embodiments, the length of the first rod body 31 may be a positive integral multiple of the length of the second rod body 32. Thus, the force between the end of the first rod body 31 away from the second rod body 32 and the foreign object 18 can be amplified by a factor of positive integer to the dynamometer 50 located at the end of the second rod body 32 away from the first rod body 31 by the force transfer rod 30. This facilitates the force detection and calculation, which can further improve the height measurement accuracy.

In some embodiments, the first rod body 31 and the second rod body 32 extend in the same direction. That is, the force transfer rod 30 is a substantially straight rod, and the first rod body 31 and the second rod body 32 are on the same straight line. Thus, the force transfer rod 30 is easy to manufacture, and has a more reliable structure and better force transmission.

In some embodiments, the height measuring apparatus 100 according to an embodiment of the present disclosure may further comprise a stabilizer 70. The stabilizer 70 may be disposed on the moving part 22 and connected with the force transfer rod 30. Therefore, the force transfer rod 30 may have a better anti-shake effect to prevent the touching head 40 from vibrating and undesired shifting while the driving mechanism 20 is moving. In this way, the force measurement is more accurate, thereby the accuracy of the height measurement is further improved.

The stabilizer 70 may comprise at least one elastic part. For example, the stabilizer 70 may comprise two elastic parts 71, 72, and there is a first elastic part 71 between the moving part 22 and the first rod body 31, and there is a second elastic part 72 between the moving part 22 and the second rod body 32. Thereby, the two elastic parts 71, 72 can mutually restrict each other, and the force transfer rod 30 may experience less vibration under the elastic force of the two elastic parts 71, 72, thereby implement a better positioning. The stabilizer 70 has a good anti-shake property and a simple structure.

It should be understood that in the present disclosure, the number of the elastic parts 71, 72 is not limited to two. It may also be one, three or four etc. The number of the first elastic part 71 connected to the first rod body 31 is not limited to one, and the number of the second elastic part 72 connected to the second rod body 32 is not limited to one as well. That is, in the stabilizer 70 of the height measuring apparatus 100 according to the embodiment of the present disclosure, at least one first elastic part 71 is connected with the first rod body 31, or at least one second elastic part 72 is connected with the second rod body 32.

In some embodiments, the moving part 22 may also comprise a fixing rod 73. The fixing rod 73 extends obliquely with respect to the vertical direction and is connected to the lower end of the moving part 22. In some embodiments, the elastic parts 71, 72 are springs, and an end of the spring is connected with (the end of) the fixing rod 73, and the other end of spring is connected with the first rod body 31 or the second rod body 32. Specifically, the spring for connecting the first rod body 31 is connected between the fixing rod 73 and the first rod body 31, and the spring for connecting the second rod body 32 is connected between the fixing rod 73 and the second rod body 32.

In some embodiments, the stabilizer 70 may be substantially centrally symmetric about the lower end of the moving part 22. In this way, the mutual restriction between the two elastic parts 71, 72 is better and the anti-shake effect is better, thereby further improving the accuracy of the height measurement. Meanwhile, such a stabilizer 70 is easy to manufacture and lower in cost.

In the present disclosure, no particular requirement is imposed on the specific structure of the frame 10, as long as the frame 10 can be used to install the driving mechanism 20. In some exemplary embodiments, the frame 10 may comprise two pillars 11 and a mounting rack 12. The two pillars 11 are arranged at intervals on the two sides of the air floating board 13. The air floating board 13 is disposed between the two pillars 11. Both ends of the mounting rack 12 are respectively connected with the upper ends of one of the two pillars 11 to form a stable support, which lays a foundation for an accurate height measurement. In some embodiments, the pillar 11 may be formed as a supporting column extending in the vertical direction. This is not only easy to manufacture but also provides good supporting effect.

The mounting rack 12 may comprise a guiding part 110. The guiding part 110 may extend in the distribution direction of the two pillars 11 (i.e., the Y direction in the drawings). The driving body 21 is movably disposed on the guiding part 110. Thereby, the driving body 21 can move in the distribution direction of the two pillars 11 under the guidance of the guiding part 110. When detecting the height of the foreign object 18, the glass plate 15 is placed above the air floating board 13. Rollers 17 are provided on both sides of the air floating board 13. The roller 17 can drive the glass plate 15 to move through the frame 10 (i.e., along the X direction in the drawings) so that the foreign object 18 on the glass plate 15 moves relative to the touching head 40, so that the touching head 40 can move with respect to the foreign object 18 in a two-dimensional plane.

During the actual installation, the frame 10 may be installed above the air floating board 13 as avoiding the field of view of the location detector 90 (for example, a charge coupled device (CCD)). The frame 10 is responsible for the movement of the driving body 20 in the Y direction. Then the driving body 20 is mounted on the frame 10. When the height measuring apparatus 100 does not perform the height measuring task, the driving body 20 may move to the vicinity of the pillar 11 and away from the glass plate 15. During the measurement, the location of the foreign object 18 can be determined by the location detector 90, and the touching head 40 can be moved to a location corresponding to the foreign object 18 through the operation of the roller 17 and the driving body 20. Before the detection, the touching head 40 is in a reference position H which has the same altitude as (the upper surface of) the glass plate 15. This reference position is used to calibrate the initial position of the height measuring system.

When the height measuring apparatus 100 detects the presence of the foreign object 18 on the glass plate 15, according to the location detected by the location detector 90, the touching head 40 may be moved to a location over the foreign object 18 through the movement of the driving mechanism 20 on the frame 10 and the movement of the glass plate 15 by the roller 17. Then, the driving mechanism 20 moves the force transfer rod 30 downward by driving the moving part 22. When the touching head 40 contacts the foreign object 18, the end of the first rod body 31 close to the foreign object 18 is stationary with respect to the foreign object 18, and is subjected to the force in a direction away from the foreign object 18. Since the moving part 22 continues to move downwards, the end of the second rod body 32 away from the foreign object 18 moves downward. In this process, the force applied to the dynamometer 50 by the end of the second rod body 32 away from the foreign object 18 gradually increases, and the value of the force is continuously transmitted to the controller. When the value of this force reaches a predetermined force value, the controller will stop the driving mechanism 20 from moving. At this time, the optical ruler 213 of the driving mechanism 20 indicates the position H1 of the moving part 22. The difference between the position H1 and the reference position H is the height H' of the foreign object 18 (i.e., H'=H−H1).

In some embodiments, the height measuring apparatus 100 may also comprise a driver. The driver may be connected with the driving body 21, and make the driving body 21 moving under the control of the controller. In this way, the driving body 21 can move automatically along the frame 10 without manual intervention, so that the degree of automation is higher and the operation is more convenient. In some embodiments, the driving body 21 is not only responsible for the vertical movement of the moving part 22, but also for transmitting the location of the driving body 21 to the controller to control the movement of the driving body 21 in real time.

In some embodiments, the altitude detector 80 is configured to read the position of the moving part 22 on the ruler 213 and transmit this position to the controller to calculate the value of the height of the foreign object 18. Thereby, the value of the height can be automatically detected without manual intervention, resulting in a greater automation degree. Further, the controller can be configured to alert when the value of the height of the foreign object 18 is greater than a predetermined height value, to automatically alert the exceptions of the foreign object 18.

In the present disclosure, the structure of the touching head 40 is not specifically restricted. In some embodiments, the touching head 40 may be a flat plate that is parallel to the horizontal plane, and some means may be used to keep the touching head 40 being horizontal. Therefore, the touching head 40 can press against the foreign object 18 more stably and reliably, thereby further improving the accuracy of detection. In some embodiments, the touching head 40 is a round flat plate, which is easy to manufacture and has good touch characteristics. In some exemplary embodiments, the size of the flat plate can be designed according to the specific situation. For example, the flat plate can have a diameter of 2 mm. It should be understood that the sizes of the touching head 40 and the foreign object 18 in the drawings are schematic and does not constitute a limitation to the diameter of the touching head 40. As shown in FIG. 3, the middle of the touching head 40 can be connected to the force transfer rod 30 through a vertical rod, which provides a good connecting effect. The vertical rod can be kept vertical by some means so that the flat plate remains horizontal. Alternatively, a vertical sensor or a horizontal sensor may be disposed on the vertical rod or the flat plate. Once the vertical bar is not vertical or the flat plate is not horizontal, the moving part 22 stops moving. In addition, the predetermined force value of the dynamometer 50 may be set according to the structure of the touching head 40.

Figure 4:
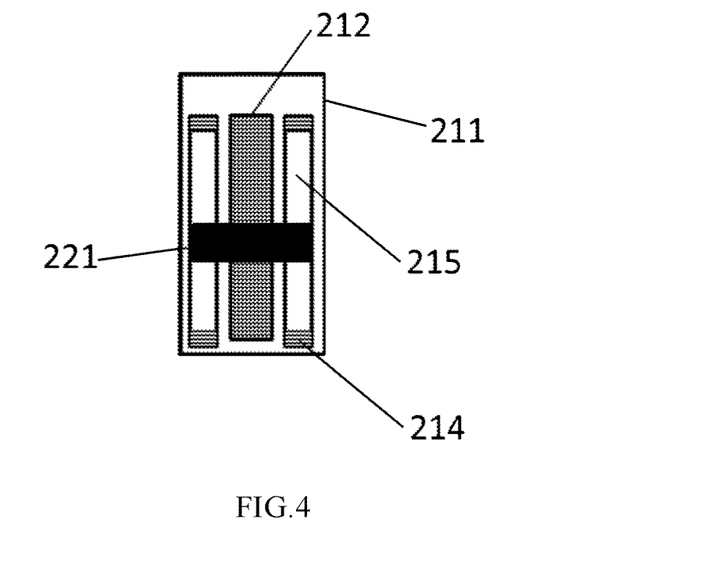
FIG. 4 schematically shows a structural view of a driving mechanism of a height measuring apparatus according to an embodiment of the present disclosure.
Figure 5:
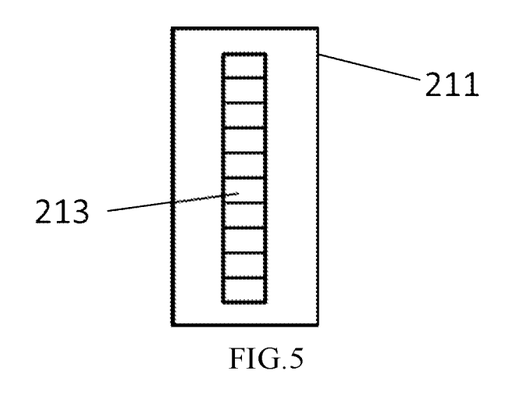
FIG. 5 schematically shows another structural view of a driving mechanism of a height measuring apparatus according to an embodiment of the present disclosure.

In some embodiments, the driving body 21 comprises a first side and a second side opposing to each other. FIG. 4 schematically shows the first side of the driving body 21. The first side comprises a stator 212, a track 215, and a limit block 214. The track 215 can control the moving direction of the moving part 22. The moving part 22 may comprise a mover 221 and a transmission part 222. The two ends of the transmission part 222 are connected to the mover 221 and the force transfer rod 30, respectively. The force transfer rod 30 forms a lever structure with the lower end of the transmission part 222 being the fulcrum. The stabilizer 70 can be connected with the transmission part 222. The driving body 21 comprises a base body 211 and a stator 212. The base body 211 is movably connected with the frame 10. In other words, the base body 211 is movable with respect to the frame 10. FIG. 5 schematically shows a second side of the driving body 21. The ruler 213 is located on the second side. The stator 212 may act on the mover 221 so that the mover 221 can vertically move with the effect of, for example, an electromagnetic force. As a result, the moving part 22 can implement a vertical movement.

In some embodiments, the stator 212 and the ruler 213 are provided on the opposite sides of the base body 211, respectively. The base body 211 may be made of steel plate. The structural strength of the steel plate is relatively high and therefore can carry a heavy weight, so that a stable and firm installation of the driving mechanism 20 can be ensured. In an embodiment, both ends of the track 215 may further comprise limiting blocks 214. The limit block 214 may limit the mover 221 to prevent the mover 221 from moving out of the base body 211 and as a result damage the entire system or smash the glass plate 15.

In some embodiments, the moving part 22 may further comprise a fixing mount 60. An end of the fixing mount 60 is connected with the transmission part 222, and the dynamometer 50 is arranged on the other end of the fixing mount 60. Thus, the installation of the dynamometer 50 is easier and the mounting position of the dynamometer 50 is more adapted to the position of the force transfer rod 30, which makes the force measurement more convenient. In some embodiments, a supporting part 62 may be provided so that the fixing mount 60, the transmission part 222 and the supporting part 62 form a triangular structure, thereby improving the stability of the structure.

In summary, the present disclosure discloses a height measuring apparatus. The height measuring apparatus comprises a frame; a driving mechanism comprising a driving body that is connected with and movable along the frame and a moving part that is vertically movable with respect to the driving body, wherein the driving body comprises an altitude detector configured to detect an altitude of the moving part; a force transfer rod connected with the moving part to form a lever structure; a touching head connected with a first end of the force transfer rod; a dynamometer connected with a second end of the force transfer rod; a controller configured to stop the moving part from moving in response to the value of the force detected by the dynamometer reaching a predetermined force value; and a location detector configured to detect a location of a foreign object and send the detected location of the foreign object to the controller.

The height measuring apparatus according to an embodiment of the present disclosure can detect the height of the foreign object on the glass plate. With the principle of leverage amplification of the force, an accurate measurement of the force can be achieved, so that the moving part can be actuated more precisely and quickly, so that the altitude of the moving part accurately reflects the height of the foreign object, thereby accurately measuring the height of the foreign object. The height measuring apparatus according to an embodiment of the present disclosure has a simpler structure and lower cost.

It will be appreciated that the above embodiments are described by way of example only. While the embodiments have been illustrated and described in detail in the accompanying drawings and foregoing description, such illustration and description are to be considered illustrative or exemplary and not restrictive, and the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or multiple processors may implement the functionality of the controller in this disclosure. The mere fact that certain measures are recited in mutually different dependent claims does not indicate that a combination of these measures cannot be used to advantage. Any reference signs in the claims should not be construed as limiting the scope.

What is claimed is:

1. A height measuring apparatus, comprising:
    a frame;
    a driving mechanism comprising a driving body that is connected with and movable along the frame and a moving part, wherein the moving part is vertically movable with respect to the driving body, and wherein the driving body comprises an altitude detector configured to detect an altitude of the moving part;
    a force transfer rod connected with the moving part to form a lever structure;
    a touching head connected with a first end of the force transfer rod;
    a dynamometer connected with a second end of the force transfer rod;
    a controller configured to stop the moving part from moving in response to a value of the force detected by the dynamometer reaching a predetermined force value; and
    a location detector configured to detect a location of a foreign object and send the detected location of the foreign object to the controller;
    wherein the moving part comprises a mover and a transmission part, wherein the transmission part is connected between the mover and the force transfer rod, and the driving body comprises a base body and a stator, wherein the base body is movably connected with the frame, and the stator is located at the base body, connected to the moving part at the mover, and is configured to actuate the mover.

2. The height measuring apparatus according to claim 1, wherein the force transfer rod comprises a first rod body and a second rod body, and wherein a length of the first rod body is greater than a length of the second rod body.

3. The height measuring apparatus according to claim 2, wherein the length of the first rod body is a positive integer multiple of the length of the second rod body.

4. The height measuring apparatus according to claim 2, wherein the touching head is connected with an end of the first rod body furthest from the second rod body, and the dynamometer is connected with an end of the second rod body furthest from the first rod body.

5. The height measuring apparatus according to claim 2, wherein the first rod body and the second rod body extend in a same direction.

6. The height measuring apparatus according to claim 1, wherein the altitude detector comprises a ruler.

7. The height measuring apparatus according to claim 6, wherein the ruler comprises an optical ruler.

8. The height measuring apparatus according to claim 1, further comprising:
    a stabilizer located at the moving part and connected with the force transfer rod, and configured to prevent the force transfer rod from shaking.

9. The height measuring apparatus according to claim 8, wherein the stabilizer comprises at least one elastic part connected between the force transfer rod and the moving part.

10. The height measuring apparatus according to claim 9, wherein the moving part further comprises a fixing rod, and the at least one elastic part is connected to the moving part at the fixing rod.

11. The height measuring apparatus according to claim 9, wherein the force transfer rod comprises a first rod body and a second rod body, and the at least one elastic part comprises a first elastic part and a second elastic part, wherein the first elastic part is connected between the moving part and the first rod body, and the second elastic part is connected between the moving part and the second rod body.

12. The height measuring apparatus according to claim 11, wherein the moving part further comprises a fixing rod and the at least one elastic part is connected with the fixing rod, and the fixing rod extends obliquely with respect to a vertical direction, wherein the first elastic part is connected with a first end of the fixing rod, and the second elastic part is connected with a second end of the fixing rod.

13. The height measuring apparatus according to claim 1, wherein the touching head comprises a horizontal plate.

14. The height measuring apparatus according to claim 1, wherein the moving part further comprises a fixing mount connected with the transmission part, and the dynamometer is located at an end of the fixing mount furthest from the transmission part.

15. The height measuring apparatus according to claim 1, wherein the frame comprises:
   two pillars arranged at an interval from one another,
   an air floating board, wherein the two pillars are located on both sides of the air floating board;
   a mounting rack, two ends of which are respectively connected with the two pillars; and
   a guiding part, wherein the guiding part is arranged on the mounting rack along an extending direction of the mounting rack, and wherein the driving body is movable along the guiding part.

16. The height measuring apparatus according to claim 1, wherein the controller is further configured to calculate an altitude variation of the moving part based on the altitude of the moving part detected by the altitude detector.

17. The height measuring apparatus according to claim 16, wherein the controller is further configured to provide an alert in response to the altitude variation being greater than a predetermined height value.

* * * * *